(12) United States Patent
Leyden et al.

(10) Patent No.: US 10,623,038 B2
(45) Date of Patent: Apr. 14, 2020

(54) DISPLAY ASSEMBLY FOR PORTABLE ARTICLE

(71) Applicant: SE-KURE CONTROLS INC., Franklin Park, IL (US)

(72) Inventors: Roger J. Leyden, Inverness, IL (US); Lazaro Fraiman, Skokie, IL (US); Jorge L. Meza, Westchester, IL (US)

(73) Assignee: Se-Kure Controls, Inc., Franklin Park, IL (US)

( * ) Notice: Subject to any disclaimer, the term of this patent is extended or adjusted under 35 U.S.C. 154(b) by 0 days.

(21) Appl. No.: 16/239,126

(22) Filed: Jan. 3, 2019

(65) Prior Publication Data

US 2019/0379419 A1 Dec. 12, 2019

Related U.S. Application Data

(60) Provisional application No. 62/683,880, filed on Jun. 12, 2018.

(51) Int. Cl.
*H04B 1/3877* (2015.01)
*H04M 1/02* (2006.01)

(52) U.S. Cl.
CPC .......... *H04B 1/3877* (2013.01); *H04M 1/026* (2013.01)

(58) Field of Classification Search
CPC .............................. H04B 1/3877; H04M 1/026
USPC ....................................................... 455/576.1
See application file for complete search history.

(56) References Cited

U.S. PATENT DOCUMENTS

| 2011/0043436 | A1* | 2/2011 | Yamamoto | G02B 27/0172 345/8 |
| 2012/0257174 | A1* | 10/2012 | Abri | F16M 11/10 353/79 |
| 2016/0366997 | A1* | 12/2016 | Sirichai | A45C 11/00 |
| 2017/0099948 | A1* | 4/2017 | Prasad | A47B 97/001 |
| 2019/0142530 | A1* | 5/2019 | Thompson | A61B 34/25 606/130 |
| 2019/0158738 | A1* | 5/2019 | Wang | H04N 5/23238 |

\* cited by examiner

*Primary Examiner* — Inder P Mehra
(74) *Attorney, Agent, or Firm* — Wood, Phillips, Katz, Clark & Mortimer

(57) ABSTRACT

The combination of: a) a portable electronic article; and b) a display assembly. The display assembly has: a support assembly that is engaged with the portable electronic article with the portable electronic article in a display position on the display assembly; and a guide assembly configured to be operatively connected to a support and through which at least a part of the support assembly is guided in a predetermined path relative to the support to which the guide assembly is operatively connected. With the portable electronic article in the display position on the support assembly and the guide assembly operatively connected to the support, the portable article can be reoriented relative to the support by moving the at least part of the support assembly together with the portable electronic device in the predetermined path.

32 Claims, 8 Drawing Sheets

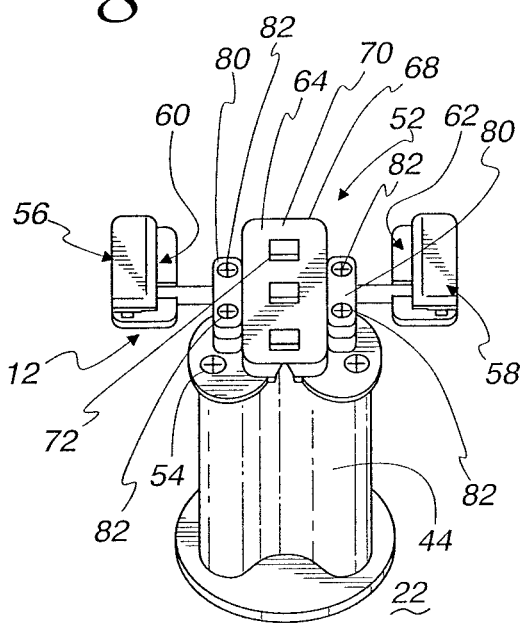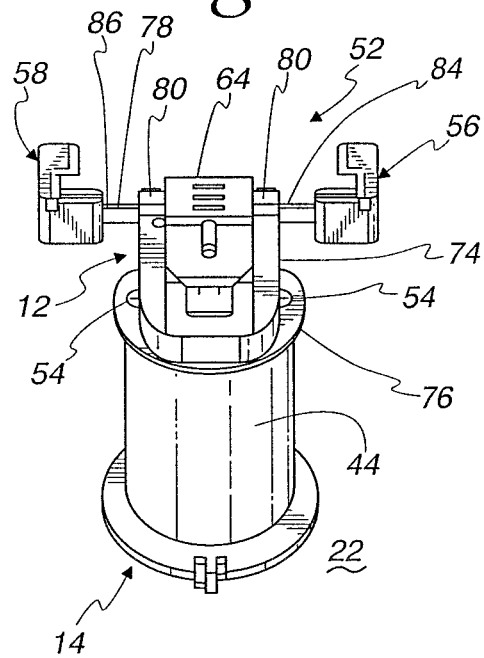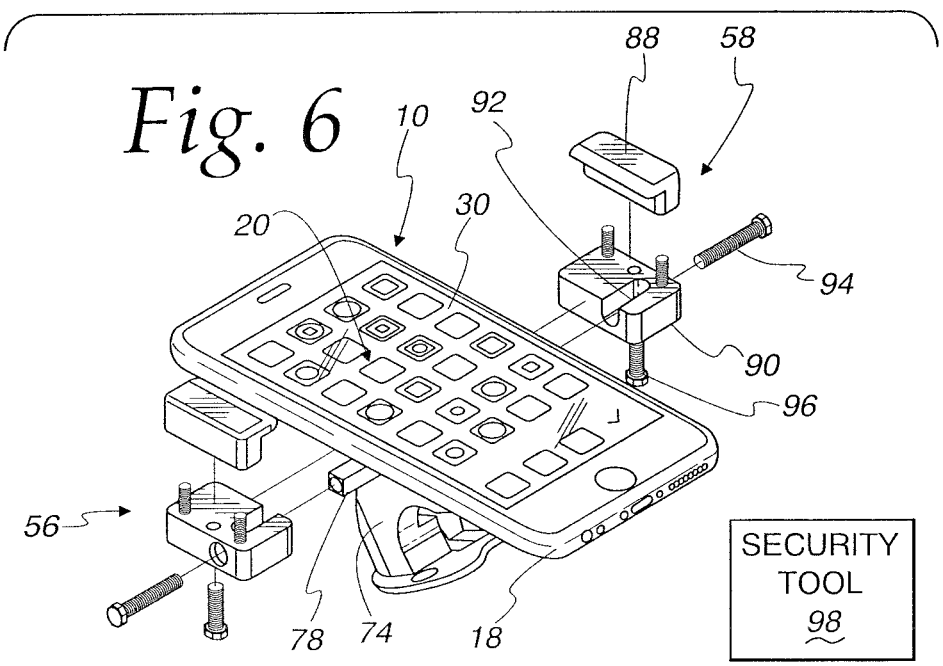

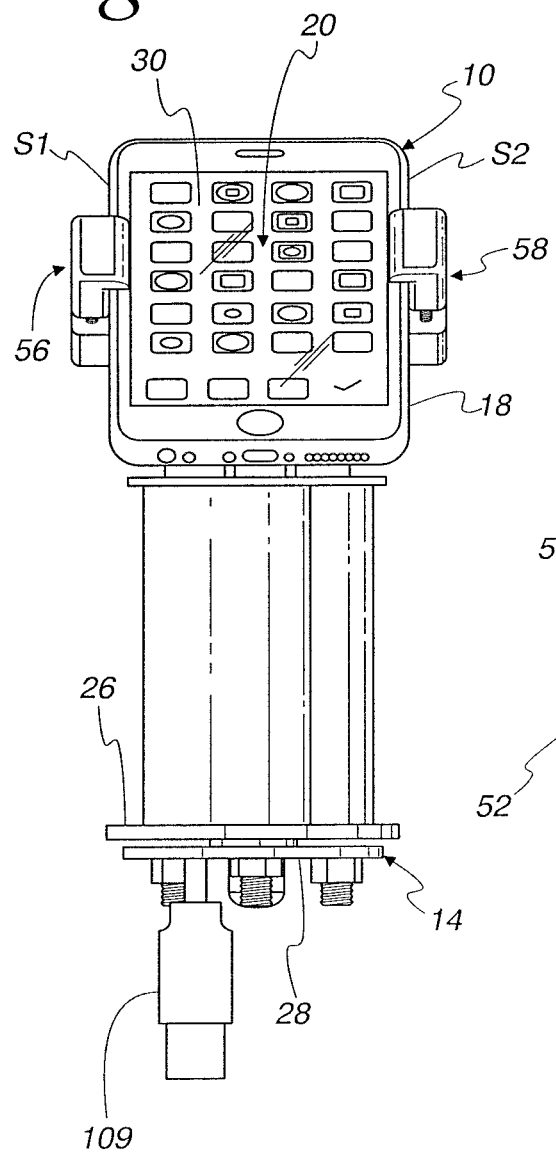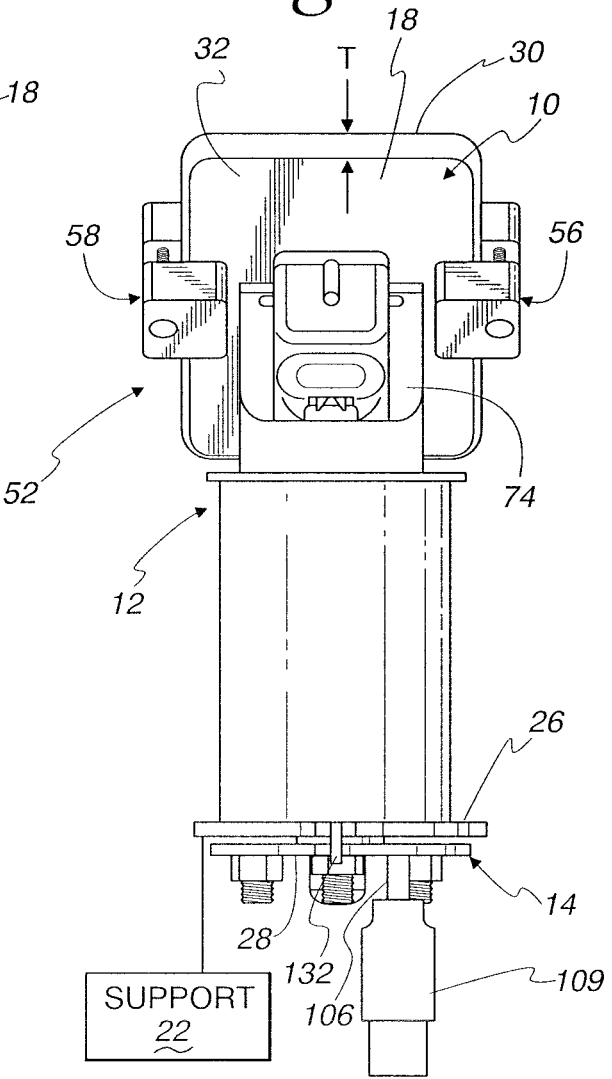

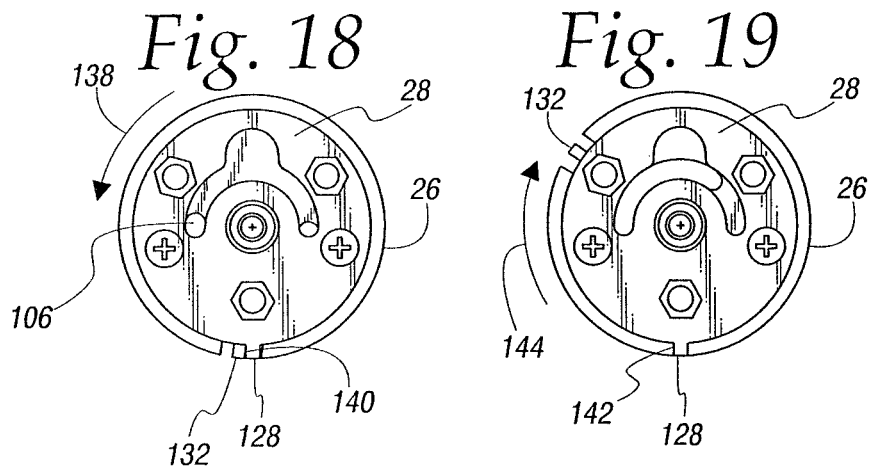
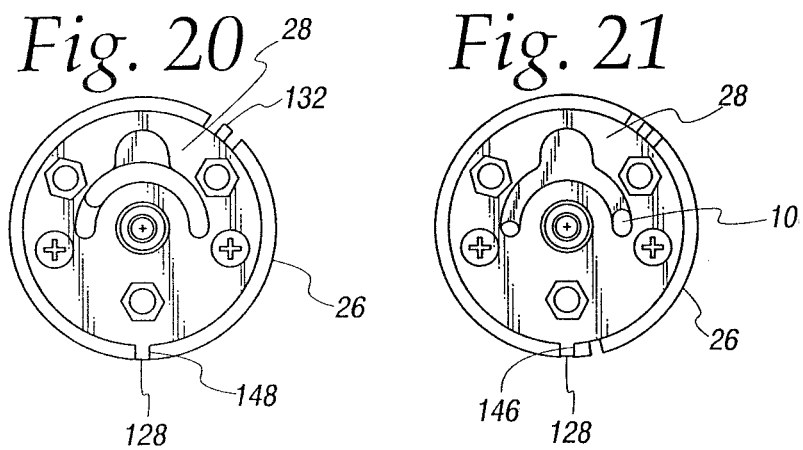
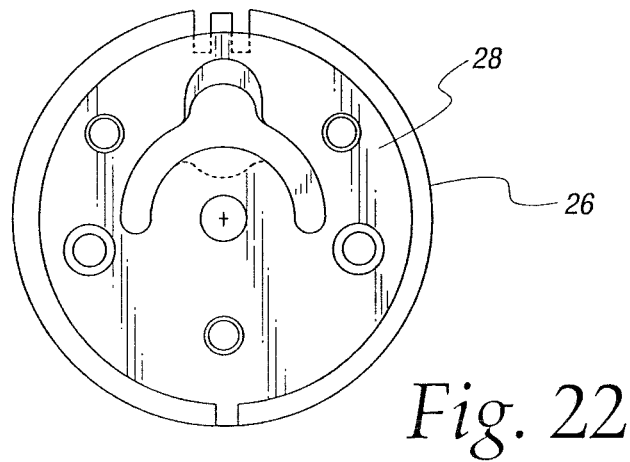

DISPLAY ASSEMBLY FOR PORTABLE ARTICLE

BACKGROUND OF THE INVENTION

Field of the Invention

This invention relates to displays for portable articles, as at point-of-purchase locations and, more particularly, to a display that allows a displayed article to be reoriented while being maintained in a secured state.

Background Art

Portable electronic articles/devices, such as phones and tablets, are displayed in large numbers in retail establishments. The growing number of manufacturers of these products, variations in form and capability, and other factors have created a highly competitive market. Thus in retail establishments, to entice consumers to make an on-site purchasing decision, these articles are displayed visibly and in a manner whereby a would-be purchaser is allowed to inspect and operate a number of competitive products and products with different looks, features, and capabilities.

Those designing displays remain focused on two competing objectives. First, the articles must be secured positively against theft. As technology evolves, phones, tablets, etc. can be made even smaller while incorporating additional capabilities, functions, features, etc. As consumer demands increase, these articles continue to become more complex and expensive, which makes them an enticing target for thieves. This is particularly a problem in retail establishments where these small devices are displayed in large numbers and wherein a thief's actions become less detectable, particularly on crowded days when persons are mingling at and around the displays.

The second design objective is to make the displays user friendly. While function remains a key purchasing objective, aesthetics still are taken into account in most purchasing decisions. Thus, ideally consumers would retain the ability to inspect substantially all of the exposed region of the article.

Additionally, the consumer should be able to conveniently operate the article in a manner that he/she would in normal use.

Those establishments that effectively display these types of articles may take sales away from other establishments that have displays that, while secure, may not afford a potential purchaser the opportunity to test the article to the extent that he/she demands before committing to make the purchase.

One common display configuration employs a pedestal that is anchored to a support surface on the display. The top of the display has structure to support an article in a raised position whereby the monitor/screen is visible. Appropriate security structure is built in to maintain the displayed article on the display.

Typical of these pedestal displays is an article support structure that maintains a displayed article in an optimal orientation to allow the consumer to conveniently see the front/display region. The flat front surface will typically be inclined from vertical so that an average height consumer, in a standing position, can view the front of the article at an appropriate angle. This fixed configuration display has a number of drawbacks.

This fixed display is designed primarily to highlight the front appearance of the article and allow its basic operation. If the consumer is interested in seeing the entire article, he/she may have to lean over and look at the back and sides of the article from a somewhat awkward stance.

Further, with a fixed display orientation, convenient inspection of the article is practical by only a single person directly in front thereof. Convenient operation of the article is also generally convenient only with the consumer in this same direct front position. If a consumer is inspecting/operating the article with another consumer or salesperson, the persons may have to shift back and forth into the optimal viewing/operating position.

Further, even though an article is in a fixed display position, consumers may still attempt to reposition it by grasping the article and exerting forces thereon. This may result in damage to the article and/or the display structure.

Recognizing the criticality of effectively displaying articles of this type in a highly competitive market, the industry has continued to develop different display configurations to optimize the user's effective interaction with an article—by viewing and operation thereof—while effectively securing the article so that article theft is effectively controlled.

SUMMARY OF THE INVENTION

In one form, the invention is directed to the combination of: a) a portable electronic article; and b) a display assembly. The display assembly has: a support assembly that is engaged with the portable electronic article with the portable electronic article in a display position on the display assembly; and a guide assembly configured to be operatively connected to a support and through which at least a part of the support assembly is guided in a predetermined path relative to the support to which the guide assembly is operatively connected. With the portable electronic article in the display position on the support assembly and the guide assembly operatively connected to the support, the portable article can be reoriented relative to the support by moving the at least part of the support assembly together with the portable electronic device in the predetermined path.

In one form, the at least part of the support assembly is guided in movement around an axis in the predetermined path.

In one form, the at least part of the support assembly is guided in movement around the axis through a range of at least 270°.

In one form, the at least part of the support assembly is guided in movement around the axis through a range of at least 330°.

In one form, the display assembly has first and second components that are guided in movement, one relative to the other, around the axis. The combination further includes at least one wire/cable that is directed through the first and second components to at least one of: a) mechanically secure the portable article in the display position relative to the support; and b) provide an electrical path to the portable article in the display position.

In one form, the first and second components respectively have first and second slots. The first and second slots are registrable with each other to allow passage of the at least one wire/cable.

In one form, the first slot is curved around the axis.

In one form, the first slot has an arcuate shape centered on the axis.

In one form, the at least one wire/cable has a connector. The first slot has a length between first and second ends. The first slot has a locally enlarged width to allow passage of at least part of the connector on the at least one wire/cable.

In one form, the first slot extends through at least 135° around the axis.

In one form, the second slot has an arcuate shape centered on the axis.

In one form, the first and second slots each extends through at least 135°.

In one form, the first and second slots each has first and second ends and a locally enlarged width between respective first and second ends. The locally enlarged width on the first and second components is registrable with the first and second components within a range of relative positions with respect to the axis.

In one form, the guide assembly has a tubular body with a vertically extending passage. The first component is fixed on the tubular body. The second component is configured to be fixed to the support with the guide assembly operatively connected to the support, whereby the tubular body is movable with the first component.

In one form, the tubular body has a top and bottom. The first component is fixed at the bottom of the tubular body. The support assembly is mounted at the top of the tubular body.

In one form, the second component is fixed to the support with the guide assembly operatively connected to the support. There are first and second surfaces on the guide assembly that block movement of the second component around the axis to within a predetermined range.

In one form, one of the first and second surfaces is on the first component.

In one form, the first and second surfaces face circumferentially oppositely with respect to the axis.

In one form, the invention is provided in further combination with at least one of a power supply and an alarm system connected through the at least one wire/cable to the portable article on the display position.

BRIEF DESCRIPTION OF THE DRAWINGS

FIG. 4 is a front and top perspective view of one exemplary form of the inventive display assembly as shown in FIGS. 1 and 3;

FIG. 5 is a rear and top perspective view of the display assembly in FIG. 4;

FIG. 6 is an exploded, perspective view showing an exemplary form of portable electronic article in relationship to an article engaging assembly making up a part of the inventive display assembly in FIGS. 4 and 5;

FIG. 10 is a front, elevation view of the display assembly as shown in FIGS. 4 and 5 and with the portable electronic article in a display position thereon;

FIG. 11 is a view of the components in FIG. 10 viewed in rear elevation;

FIGS. 18-21 are bottom views of the components in FIGS. 14-17 in assembled relationship and showing the relative positions of these components as the displayed portable electronic article is repositioned relative to a support for the display assembly; and FIG. 22 is an enlarged, bottom view of the assembled components in FIGS. 14-17 with registered, enlarged, slot portions thereon to facilitate direction of a connector therethrough.

DETAILED DESCRIPTION OF THE PREFERRED EMBODIMENT

Figure 1:
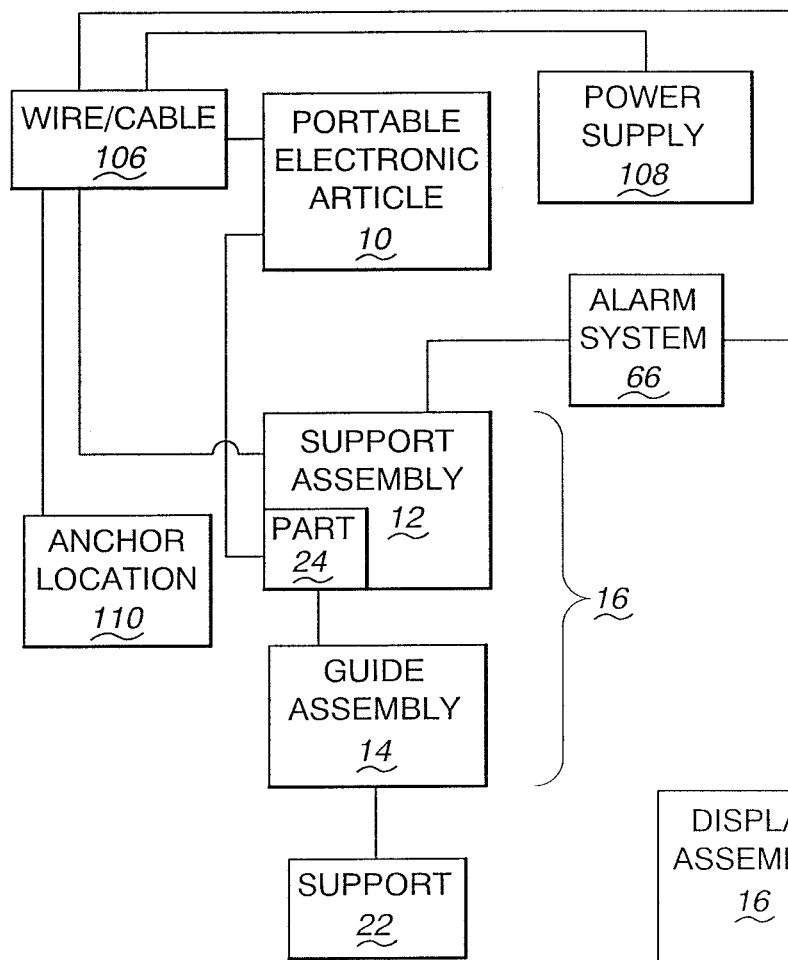
FIG. 1 is a schematic representation of the combination of a portable electronic article and the inventive display assembly, made up of support and guide assemblies.

The invention, as depicted schematically in FIG. 1, is made up of the combination of a portable electronic article 10 together with a support assembly 12 and guide assembly 14, that together make up a display assembly 16.

Figure 2:
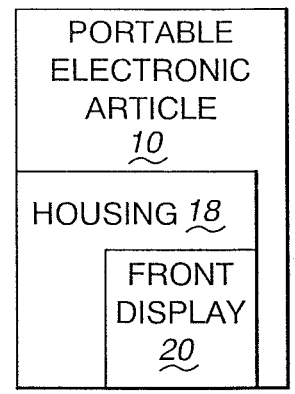
FIG. 2 is a schematic representation of a portable electronic article, as used in the combination of FIG. 1.

The portable electronic article 10 may be any type of article that is typically handheld by a user. Within this category are phones, tablets, etc. One subset of this category is shown in FIG. 2, wherein the portable electronic article 10 has a housing 18 with a front display 20 which may include a monitor, user input components, etc.

The support assembly 12 is engaged with the portable article 10 with the portable article in the display position thereon. The display assembly 16 is configured to secure the displayed portable electronic article 10 against separation therefrom.

The guide assembly 14 is configured to be operatively connected to a support 22, typically in the form of a fixed mounting structure, as at a display location. Through the guide assembly 14, at least a part 24 of the support assembly 12 is guided in a predetermined path relative to the support 22.

With the portable electronic article 10 in the display position on the support assembly 12, and the guide assembly 14 operatively connected to the support 22, the portable electronic article 10 can be reoriented relative to the support 22 by moving at least the part 24 of the support assembly 12 together with the portable electronic article 10 in the predetermined path.

Figure 3:
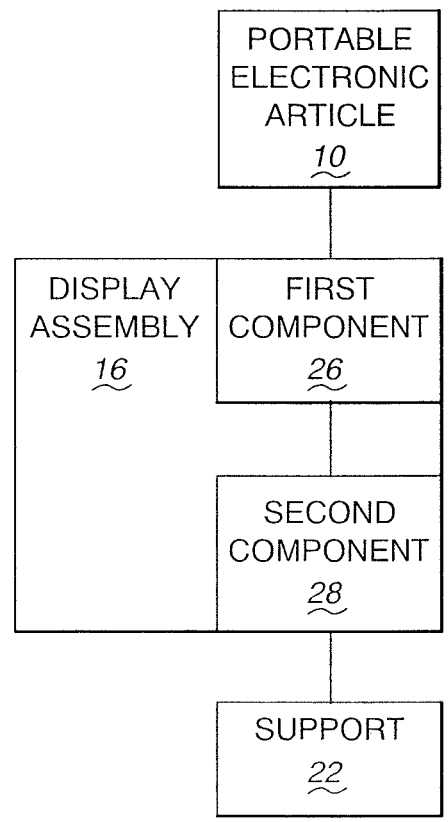
FIG. 3 is a schematic representation of the display assembly in FIG. 1 and showing further detail thereof.
Figure 7:
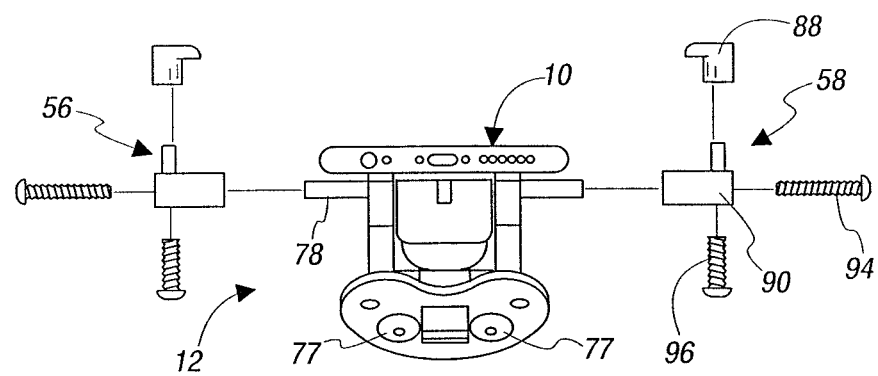
FIG. 7 is a view as in FIG. 6 but from a different perspective.
Figure 8:
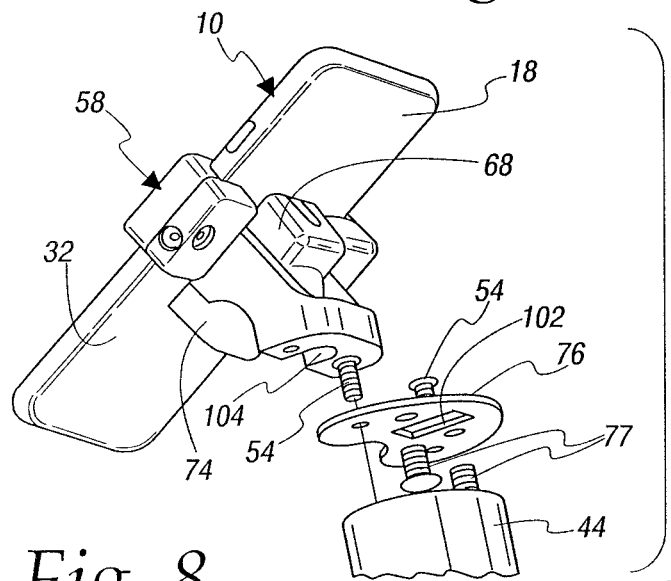
FIG. 8 is a fragmentary, perspective view of the components in FIGS. 6 and 7 in a partially assembled state and in relationship to a tubular body making up part of the inventive support assembly.
Figure 9:
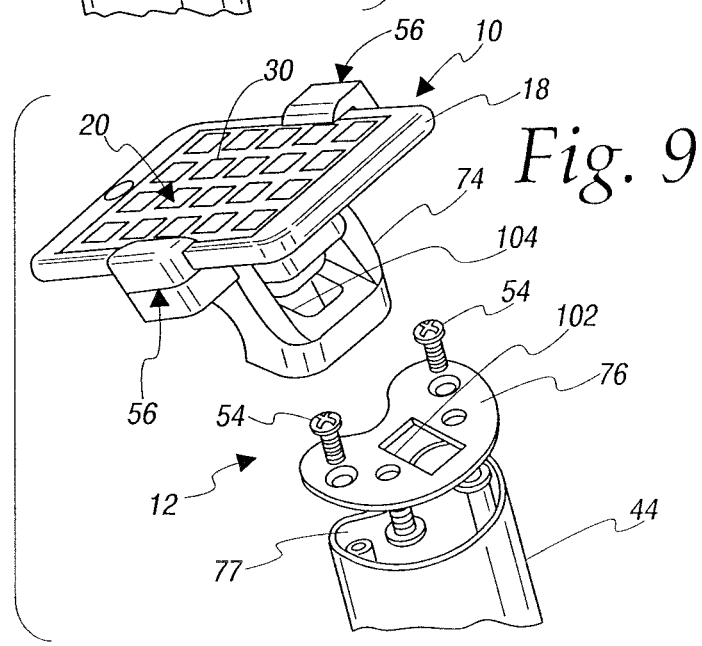
FIG. 9 is a view as in FIG. 8 but from a different perspective.

As shown schematically in FIG. 3, the display assembly 16 has first and second components 26, 28, respectively, that are guided in movement, one relative to the other, as the portable electronic article 10 is reoriented relative to support 22. The second component 28 is preferably fixed to the support 22 with the guide assembly 14 operatively connected to the support 22. The first component 26 is movable with the portable electronic article 10. The first component 26 may correspond to the part 24 in FIG. 1 or may be, or include, a different, or additional, part.

The schematic showing of components in FIGS. 1-3 is intended to encompass specific forms of the invention, as hereinbelow described, as well as virtually an unlimited number of variations of those component and their interaction. The specific forms described hereinbelow are exemplary in nature only.

Referring now to FIGS. 4-22, one specific form of the inventive combination is shown.

In the embodiment depicted, the portable electronic article 10 is in the form of a smart phone with a housing 18 having a rectangular configuration as viewed from the front, and a thickness T between front and rear surfaces 30, 32, respectively. The front display 20 occupies the majority of the area of the front surface 30 and is operated through conventional touch input technology. The support assembly 12 is engaged with the portable electronic article 10 to maintain the portable electronic article in the display position as shown in FIGS. 1 and 2.

The guide assembly 14 is operatively connected to the support 22 by being fixed thereto, as described in further detail below.

In this embodiment, the entire support assembly 12 is guided in movement around a vertically extending axis 34 in the aforementioned predetermined path.

Figure 12:
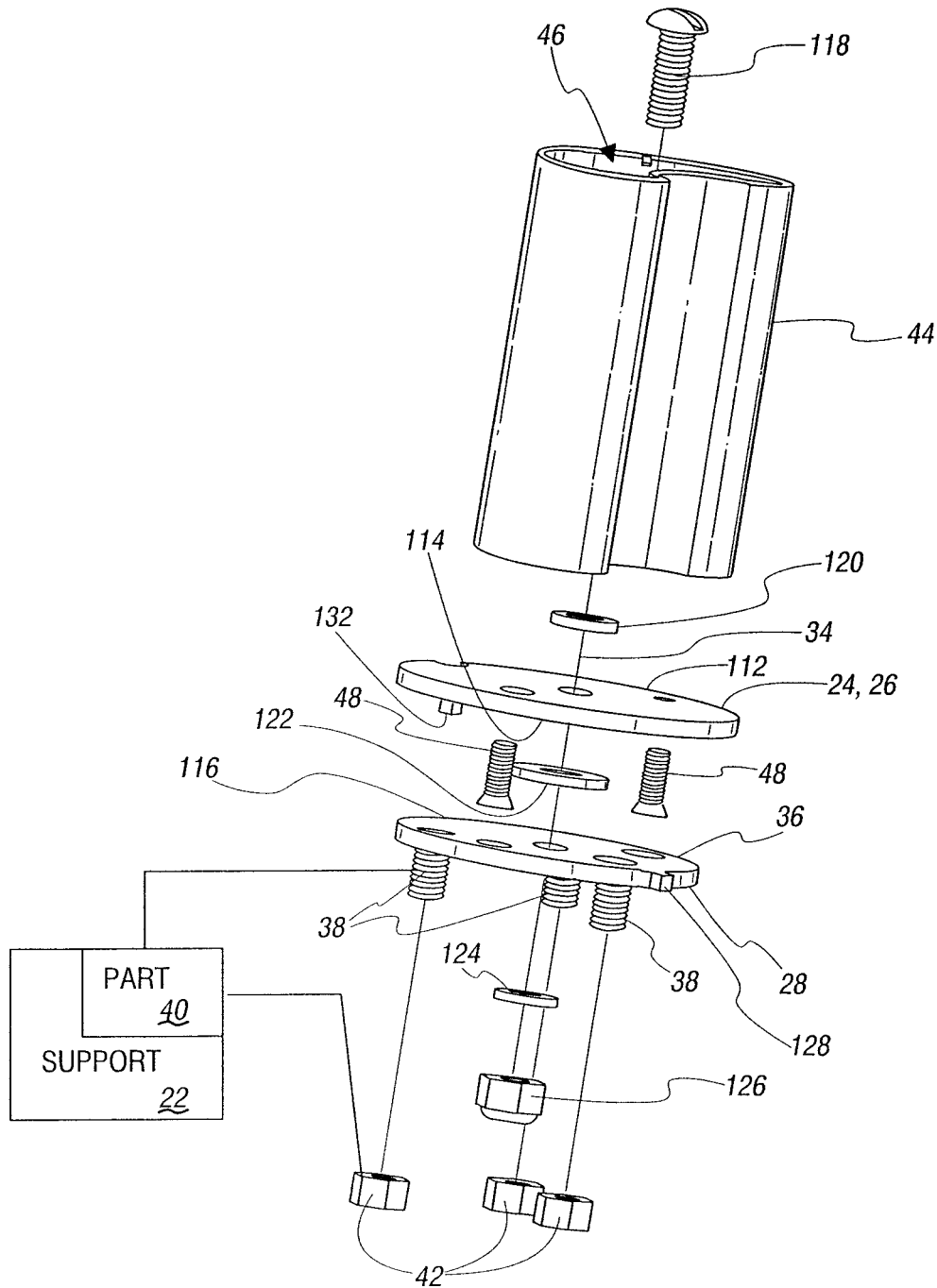
FIG. 12 is an exploded, perspective view of part of the inventive support assembly and associated guide assembly.
Figure 13:
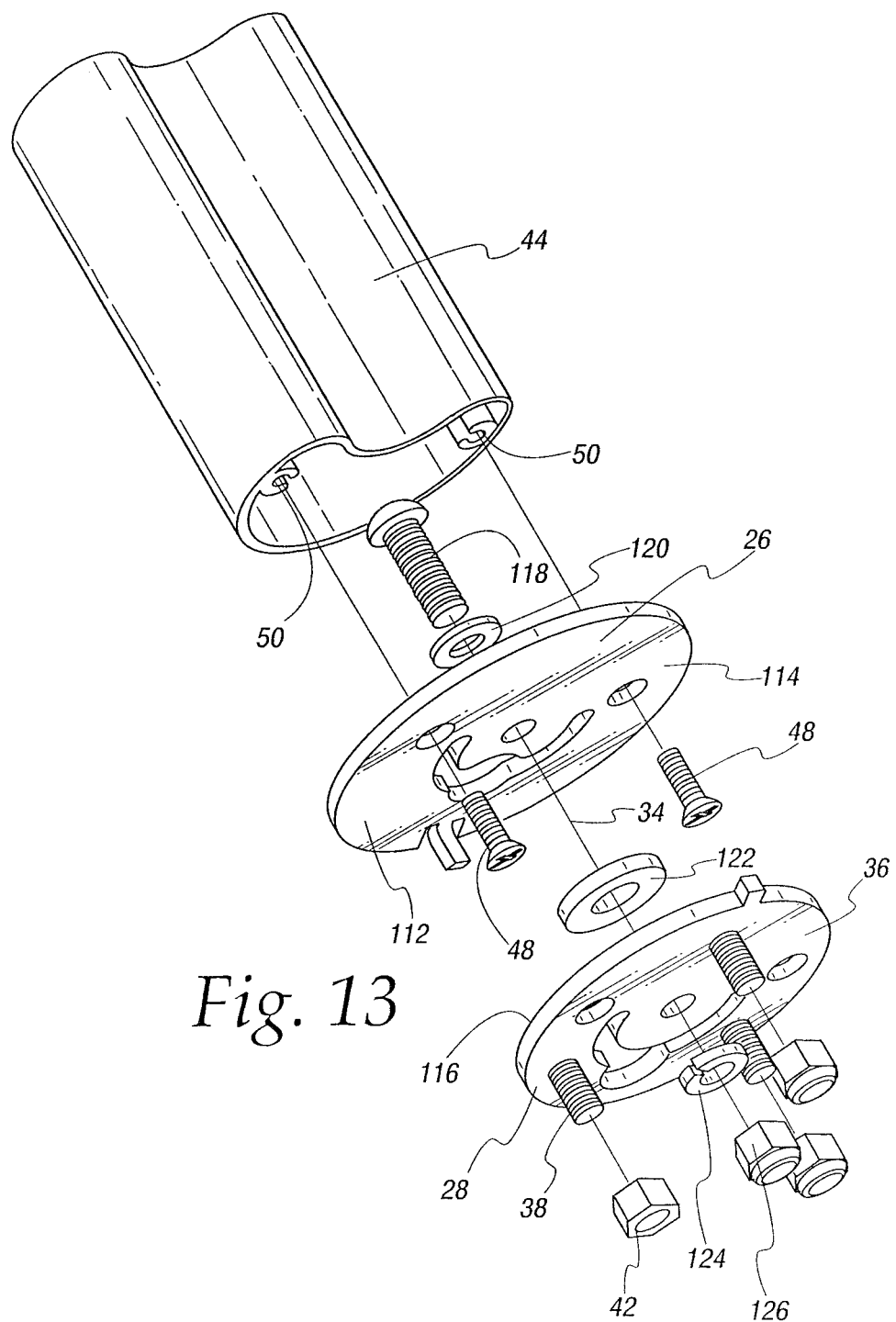
FIG. 13 is a view as in FIG. 12 but from a different perspective.
Figures 14, 15:
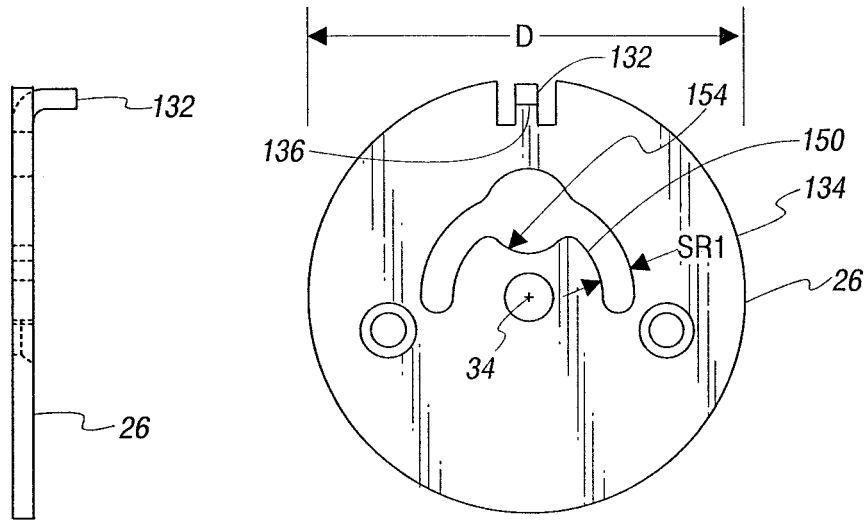
FIG. 14 is an enlarged, bottom view showing one of two cooperating components that guide relative movement between a displayed portable electronic article and a support for the inventive display assembly.
FIG. 15 is a side elevation view of the component in FIG. 14.
Figures 16, 17:
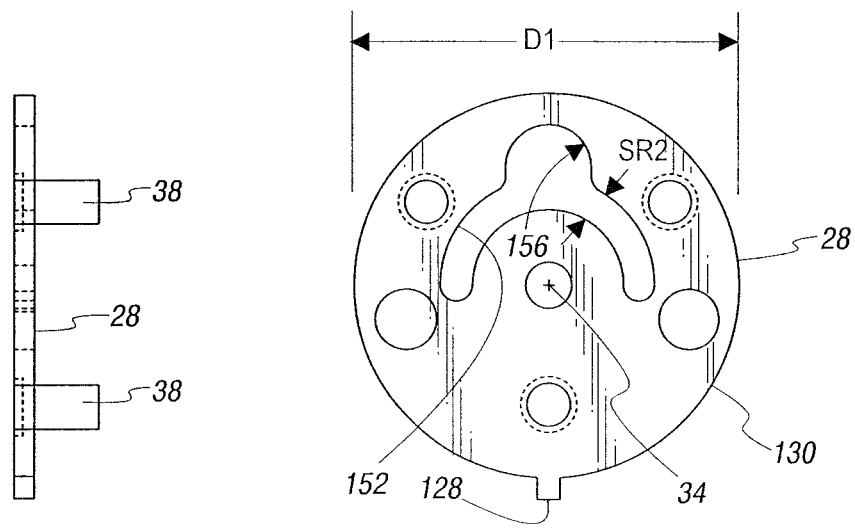
FIG. 16 is an enlarged, bottom view of a component that cooperates with the component in FIGS. 14 and 15 to guide relative movement between the displayed portable electronic article and the support for the inventive display assembly.
FIG. 17 is a side elevation view of the component in FIG. 16.

The second component 28 on the display assembly 16 consists of a generally flat body 36 from which fixed, threaded mounting studs 38 project in cantilever fashion in a common direction. As seen in FIG. 12, each of the mounting studs 38 can project through a part 40 of the support 22 to allow engagement with a threaded nut 42. With the nuts 42 tightened, the support part 40 is securely captively held to maintain the body 36 in a fixed position relative to the support 22 with the guide assembly 14 operatively connected thereto.

Of course, the specific structure for securing the body 36 to the support 22 is not limited to the rigid fixing structure shown. Virtually any structure for securement against separation is contemplated.

The support assembly part 24/first component 26 is fixed to the bottom of a hollow, tubular body 44 with a vertically extending through passage 46. In this embodiment, the part 24 includes the first component 26, shown in FIG. 3. A pair of fasteners 48 are directed through the first component 26 and into bores 50 at the bottom of the body 44 to fixedly maintain the first component 26 and tubular body 44 together.

The support assembly 12 further includes an article engaging assembly 52 that is fixed through threaded fasteners 54 at the top of the tubular body 44.

The precise configuration of the assembly 52 is not critical, as a multitude of different designs are currently commercially available. The assembly 52 may be constructed to accept only a single configuration of portable electronic article 10 or may be adjustable to adapt to different sizes and shapes.

In this embodiment, laterally spaced grippers 56, 58 are provided to secure the portable electronic article 10. The grippers 56, 58 each defines a U-shaped receptacle 60, 62, respectively, that open towards each other. The grippers 56, 58 together captively engage opposite sides S1, S2 of the housing 18. The grippers 56, 58 are configured so that they do not overlie a significant region of the front display 20, as seen most clearly in FIG. 10.

The grippers 56, 58 are arranged so that the portable electronic article 10 in the display position is angled for optimal viewing by an individual situated in a standing position in front of the display. The grippers 56, 58 are fixed in this holding position in a manner that they cannot be released by an unauthorized individual. This can be accomplished in a number of different manners, as by using fasteners with specially designed tools, as described in further detail below.

In this embodiment, a component 64 on an alarm system, shown schematically at 66 in FIG. 1, also engages and supports the portable electronic article 10 in its display position. The component 64 has a housing 68 with a flat surface 70 that facially engages the rear surface 32 of the housing 18.

The component 64 also has an associated button 72 that is normally biased to project outwardly from the flat surface and is depressed with the housing 18 bearing against the flat surface 70 and the portable electronic article 10 in its display position. Accordingly, the housing 68 and grippers 56, 58 cooperate to maintain the portable electronic article in its display position.

The housing 68 and grippers 56, 58 are rigidly supported on the tubular body 44 by a bracket 74 that is fixed to a plate 76 through fasteners 77. The plate thus becomes part of the article engaging assembly 52 that is maintained on the tubular body 44 through the aforementioned fasteners 54.

An elongate mounting bar 78 spans over the bracket 74 and is held thereagainst by overlying straps 80 that are fixed by fasteners 82 extended therethrough into the bracket 74.

With this arrangement, cantilevered ends 84, 86 project oppositely from the housing 68 and respectively serve as a support for the grippers 56, 58.

The grippers 56, 58 are connected to the mounting bar 78 in like fashion. The exemplary gripper 58 consists of joinable parts 88, 90, with the latter having a receptacle 92 into which the bar end 86 extends. A fastener 94 is directed through the gripper part 90 and into the mounting bar end 86 to effect securement. The gripper parts 88, 90 are fixed together with a separate fastener 96.

As noted previously, all fasteners that are accessible to be turned/operated are preferably provided with security type fittings to be engaged by a complementary, security tool 98, shown schematically in FIG. 6.

The plate 76 and bracket 74 define a subassembly that is attached as a unit to the tubular body 44. The plate 76 has a squared opening 102 that registers with an opening 104 formed through the bracket 74 thereby to define a continuous opening through the tubular body passage 46, the plate 76, the bracket 74, and up to the housing 68 and/or displayed portable electronic article 10.

Accordingly, an electrical wire and/or mechanical cable 106, shown schematically in FIG. 1, can be routed upwardly through the tubular body 44. In the event that the wire/cable 106 is used to provide power to the portable electronic article 10, the wire/cable 106 can be electrically connected between the portable electronic article 10 and an appropriate power supply 108. Alternatively, or in addition to facilitating powering, the wire/cable 106 can be used to operate the alarm system 66 through a direct connection to the portable electronic article and/or the article engaging assembly 52, whereby an alarm would be sounded in the event of a breach—triggered by separation of the portable electronic article 10, severance of the wire/cable 106, etc.

In the event that the wire/cable 106 performs a mechanical function, appropriate connection to an anchor location 110, shown schematically in FIG. 1, may be effected. The anchor location 110 may be a separate structure or part of the support 22.

As noted above, the first component 26 is rigidly connected to the tubular body 44 to move as one piece therewith. The identification of the first component 26 as a separate element, even though it is integral with the entire moving part 24, is a convenience for descriptive purposes. In this embodiment, the flat configuration of the body 112 of the first component 26 produces a flat, downwardly facing surface 114.

The body 36 of the second component 28 has a similar flat shape with an upwardly facing flat surface 116. A threaded fastener 118 extends downwardly through a split washer 120, the first component 26, a nylon washer 122, the second component 28, and a split washer 124, and is secured by a nut 126 with a locking capability. A nylon insert is typically used for this purpose. The fastener 118 is tightened to an extent that the oppositely facing component surface 114, 116 are in close proximity and are allowed to move guidingly, one relative to the other around the axis 34, against opposite surfaces of the nylon spacing washer 24, with a slight spacing maintained therebetween by the nylon spacing washer 122.

Of course, other structures could be devised to allow relative, guided turning between the displayed portable electronic article 10 and the support 22.

The first and second components 26, 28 are constructed so that the wire/cable 106 can pass therethrough and potentially may be undetectable from the top of the tubular body 44 downwardly. This creates a neat appearance, avoids wire/cable tangling, and reduces the risk that the wire/cable 106 will be intentionally compromised.

Optimal flexibility, in terms of reorientation of the displayed portable electronic article 10, is achieved by allowing turning of the displayed portable electronic article 10 around the axis 34 relative to the support 22 through almost a full 360°. Unrestrained turning would potentially result in tangling or kinking of the wire/cable 106. Thus, the first and second components 26, 28 are constructed so that they permit the displayed portable electronic article 10 to move around the axis 34 back and forth through slightly less than 360° without permitting turning in either direction a full 360° or more.

In this embodiment, each of the first and second components 26, 28 has a disk shape, with the first component 26 having a diameter D relative to the axis 34 that is greater than the corresponding diameter D1 of the second component 28.

The second component 28 has a tab 128 that projects radially outwardly from its circumferential surface 130. The first component 26 has an integrally formed, bent tab 132 that depends therefrom adjacent its circumferential surface 134.

The tabs 128, 132 are configured so that the tab 132 will be in vertically/axially overlapping relationship with the tab 128. As the first component 26 is moved with the tubular body 44 around the axis 34, the radially inwardly facing surface 136 of the tab 132 moves guidingly against the circumferential surface 130 on the second component 28. Alternatively, the surface 136 may be in close proximity to the circumferential surface 130.

As seen in FIGS. 18-21, movement of the first component 26 in the direction of the arrow 138 in FIG. 18 brings one circumferentially facing surface 140 on the tab 132 into abutting relationship with circumferentially oppositely facing surface 142 on the tab 128, to thereby arrest relative movement therebetween around the axis 34. Turning of the first component 26 from the FIG. 18 position in the direction of the arrow 144 in FIG. 19 progressively brings the first component to the FIG. 21 position, wherein a circumferentially facing surface 146, facing oppositely to the tab surface 140, abuts to a circumferentially facing surface 148 on the tab 128, facing oppositely to the surface 142.

Thus, the limitation in turning short of a full 360° is dictated by the circumferential dimensions of the tabs 128, 132. Ideally, this range is at least 270°, and more preferably 330°.

To accommodate the wire/cable 106, the first and second components 26, 28 respectively have first and second slots 150, 152 which are at least partially registrable through some or all of the range of movement of the first and second components 26, 28 relative to each other around the axis 34 to cooperatively define a passage for the wire/cable 106 to pass through the components 26, 28. As a result, as the first and second components 26, 28 turn, the wire/cable 106, and potentially an additional wire/cable, may remain in registration with the slots 150, 152 and follow generally the path of turning movement of the first component 26 around the axis 34.

While not required, the slots 150, 152 are preferably arcuate, with a shape centered on the axis 34.

In one preferred form, each of the first and second slots 150, 152 extends through at least 135° in its arcuate path. As depicted, each of the slots 150, 152 extends through slightly greater than 180°.

As depicted, the first and second slots 150, 152 have slot radii SR1, SR2, respectively, that are substantially the same and coincide substantially fully in a radial direction. This, however, is not a requirement.

Between the ends of the slot 150, the slot 150 is radially enlarged at 154. The slot 152 is similarly radially enlarged at 156.

The enlarged slot regions are at least partially registrable, as shown in FIG. 22, to allow passage of an enlarged connector, such as exemplary connector 109 shown in FIGS. 10 and 11.

In the embodiment depicted, the shapes of the enlarged slot regions are not the same, as seen clearly in FIG. 22. This design was selected to avoid inadvertent migration of the particular connector upwardly as might create a binding condition that could inflict damage upon the wire/cable 106 and/or connector 109 associated therewith.

In FIGS. 18-21, exemplary movement of the wire/cable within the registered slots 150, 152 throughout the range of movement is shown. In FIG. 18, the displayed portable article 10 is turned to one extreme around the axis 34. As the portable electronic article 10 moves to the other range extreme, the wire/cable 106 eventually assumes the FIG. 21 position.

The foregoing disclosure of specific embodiments is intended to be illustrative of the broad concepts comprehended by the invention.

The invention claimed is:
1. An article display system comprising:
a) a portable electronic article; and
b) a display assembly comprising:
a support assembly that is engaged with the portable electronic article with the portable electronic article in a display position on the display assembly; and
a guide assembly configured to be operatively connected to a support and through which at least a part of the support assembly is guided in a predetermined path relative to the support to which the guide assembly is operatively connected, whereby with the portable electronic article in the display position on the support assembly and the guide assembly operatively connected to the support, the portable article can be reoriented relative to the support by moving the at least part of the support assembly together with the portable electronic device in the predetermined path, wherein the at least part of the support assembly is guided in movement around an axis in the predetermined path, wherein the display assembly comprises first and second components that are guided in movement, one relative to the other, around the axis and cooperatively define a passage to allow at least one wire/cable to be directed through the passage defined cooperatively by the first and second components to at least one of: a) mechanically secure the portable article in the display position relative to the support; and b) provide an electrical path to the portable article in the display position.

2. The article display system according to claim 1 wherein the at least part of the support assembly is guided in movement around the axis through a range of at least 270°.

3. The article display system according to claim 1 wherein the at least part of the support assembly is guided in movement around the axis through a range of at least 330°.

4. The article display system according to claim 1 further in combination with at least one wire/cable directed through the passage and an alarm system connected through the at least one wire/cable to the portable article in the display position.

5. The article display system according to claim 1 wherein the first and second components respectively have first and second slots, the first and second slots register with each other to define the wire/cable passage.

6. The article display system according to claim 1 wherein the first and second components respectively have first and second curved slots, the first and second slots registrable with each other to allow passage of the at least one wire/cable.

7. The article display system according to claim 6 wherein the first slot has an arcuate shape extending around the axis.

8. The article display system according to claim 7 wherein the second slot has an arcuate shape extending around the axis.

9. The article display system according to claim 8 wherein the arcuate shapes of the first and second slots are centered on the axis.

10. The article display system according to claim 1 wherein the guide assembly comprises a tubular body with a vertically extending passage, the first component is fixed on the tubular body, and the second component is configured to be fixed to the support with the guide assembly operatively connected to the support, whereby the tubular body is movable with the first component.

11. The article display system according to claim 10 the tubular body has a top and bottom, the first component is fixed at the bottom of the tubular body and the support assembly is mounted at the top of the tubular body.

12. The article display system according to claim 1 wherein the second component is fixed to the support with the guide assembly operatively connected to the support and there are first and second surfaces on the guide assembly that block movement of the second component around the axis to within a predetermined range.

13. The article display system according to claim 12 wherein one of the first and second surfaces is on the first component.

14. The article display system according to claim 13 wherein the first and second surfaces face circumferentially oppositely with respect to the axis.

15. An article display system comprising:
a) a portable electronic article; and
b) a display assembly comprising:
a support assembly that is engaged with the portable electronic article with the portable electronic article in a display position on the display assembly; and
a guide assembly configured to be operatively connected to a support and through which at least a part of the support assembly is guided in a predetermined path relative to the support to which the guide assembly is operatively connected, whereby with the portable electronic article in the display position on the support assembly and the guide assembly operatively connected to the support, the portable article can be reoriented relative to the support by moving the at least part of the support assembly together with the portable electronic device in the predetermined path, wherein the at least part of the support assembly is guided in movement around an axis in the predetermined path, wherein the display assembly comprises first and second components that are guided in movement, one relative to the other, around the axis and the combination further includes at least one wire/cable that is directed through the first and second components to at least one of: a) mechanically secure the portable article in the display position relative to the support; and b) provide an electrical path to the portable article in the display position.

16. The article display system according to claim 15 wherein the first and second components respectively have first and second slots, the first and second slots registrable with each other to allow passage of the at least one wire/cable.

17. The article display system according to claim 16 wherein the first slot is curved around the axis.

18. The article display system according to claim 17 wherein the first slot has an arcuate shape centered on the axis.

19. The article display system according to claim 18 wherein the at least one wire/cable has a connector, the first slot has a length between first and second ends, and the first slot has a locally enlarged width to allow passage of at least part of the connector on the at least one wire/cable.

20. The article display system according to claim 19 wherein the first and second slots each has first and second ends and a locally enlarged width between respective first and second ends, the locally enlarged width on the first and second components registrable with the first and second components within a range of relative positions with respect to the axis.

21. The article display system according to claim 18 wherein the first slot extends through at least 135° around the axis.

22. The article display system according to claim 18 wherein the second slot has an arcuate shape centered on the axis.

23. The article display system according to claim 22 wherein the first and second slots each extends through at least 135°.

24. The article display system according to claim 15 wherein the guide assembly comprises a tubular body with a vertically extending passage, the first component is fixed on the tubular body, and the second component is configured to be fixed to the support with the guide assembly operatively connected to the support, whereby the tubular body is movable with the first component.

25. The article display system according to claim 24 wherein the tubular body has a top and bottom, the first component is fixed at the bottom of the tubular body and the support assembly is mounted at the top of the tubular body.

26. The article display system according to claim 15 wherein the second component is fixed to the support with the guide assembly operatively connected to the support and there are first and second surfaces on the guide assembly that block movement of the second component around the axis to within a predetermined range.

27. The article display system according to claim 26 wherein one of the first and second surfaces is on the first component.

28. The combination article display system according to claim 26 wherein the first and second surfaces face circumferentially oppositely with respect to the axis.

29. The article display system according to claim 15 wherein the at least one wire/cable is directed through the first and second components to mechanically secure the portable article in the display position relative to the support.

30. The article display system according to claim 15 wherein the at least one wire/cable is directed through the first and second components to provide an electrical path to the portable article in the display position.

31. An article display system comprising:
a) a portable electronic article; and
b) a display assembly comprising:
   a support assembly that is engaged with the portable electronic article with the portable electronic article in a display position on the display assembly;
   a guide assembly configured to be operatively connected to a support and through which at least a part of the support assembly is guided in a predetermined path relative to the support to which the guide assembly is operatively connected,
   whereby with the portable electronic article in the display position on the support assembly and the guide assembly operatively connected to the support, the portable article can be reoriented relative to the support by moving the at least part of the support assembly together with the portable electronic device in the predetermined path; and
   an alarm system connected through at least one wire/cable to the portable article in the display position that generates an alarm in the event that the portable electronic article is separated from the at least one wire/cable or the at least one wire/cable is severed,
   the at least one wire/cable extending through the display assembly.

32. The article display system according to claim 31 wherein the at least part of the support assembly is guided in movement around an axis in the predetermined path.

* * * * *